United States Patent [19]
Taylor et al.

[11] Patent Number: 5,569,994
[45] Date of Patent: Oct. 29, 1996

[54] METHOD AND APPARATUS FOR SENSORLESS CONTROL OF PERMANENT-MAGNET SYNCHRONOUS MOTORS

[75] Inventors: David G. Taylor, Marietta, Ga.; Kenneth R. Shouse, San Antonio, Tex.

[73] Assignee: Georgia Tech Research Corporation, Atlanta, Ga.

[21] Appl. No.: 330,187

[22] Filed: Oct. 27, 1994

Related U.S. Application Data

[63] Continuation-in-part of Ser. No. 972,565, Nov. 6, 1992, abandoned.
[51] Int. Cl.$^6$ ..................................................... H02P 6/16
[52] U.S. Cl. ...................... 318/700; 318/721; 388/928.1
[58] Field of Search ...................................... 318/700, 720, 318/721, 722, 723, 724, 138, 254, 439; 388/907.5, 928.1

[56] References Cited

U.S. PATENT DOCUMENTS

| | | | |
|---|---|---|---|
| 5,378,975 | 1/1995 | Schweid et al. | 318/685 |
| 5,384,527 | 1/1995 | Rozman et al. | 318/254 X |

*Primary Examiner*—Bentsu Ro
*Attorney, Agent, or Firm*—Deveau, Colton & Marquis

[57] ABSTRACT

A method of estimating and controlling rotor position and velocity for a multi-phase brushless permanent-magnet motor by measuring only the stator phase currents at a high sampling rate. Measurements of the stator phase currents are used to obtain estimates of rotor position and velocity. In turn, these estimates are used to determine an amount of voltage to apply to each stator phase so as to obtain a desired regulation of rotor position or velocity, or to command rotor position or velocity to follow a desired trajectory.

12 Claims, 2 Drawing Sheets

METHOD AND APPARATUS FOR SENSORLESS CONTROL OF PERMANENT-MAGNET SYNCHRONOUS MOTORS

This is a continuation-in-part of application Ser. No. 07/972,565, filed on Nov. 6, 1992, now abandoned.

FIELD OF THE INVENTION

This invention relates generally to permanent-magnet synchronous motors and, more particularly, to a method and apparatus for estimating the rotor position and rotor velocity of a permanent-magnet synchronous motor operating without shaft-mounted motion sensors.

BACKGROUND OF THE INVENTION

Permanent-magnet synchronous motors are brushless motors characterized by low cost, physical ruggedness, and simple construction. There are essentially three types of construction for such motors. The "surface-magnet" type has radially magnetized arc-shaped magnets attached to the surface of a smooth rotor and is widely available with either sinusoidal (due to distributed phase windings) or trapezoidal (due to concentrated phase windings) back-EMF voltage characteristics. The "interior-magnet" type has alternately poled, radially or circumferentially magnetized, rectangular magnets embedded in a smooth rotor, with distributed or concentrated phase windings. The "hybrid-stepper" type has a single axially magnetized cylindrical rotor magnet enclosed by a two-piece rotor shell having projecting rotor teeth (with teeth offset between the two pieces), and the stator has concentrated phase windings on pairs of projecting poles. In the absence of magnetic saturation, the surface-magnet and hybrid-stepper types generally do not exhibit angle-dependent phase inductance, whereas the interior magnet type generally does exhibit this characteristic.

Regardless of their specific construction features, permanent-magnet synchronous motors are attractive as servo drives because of their high power densities. The stator phases of such motors may be electrically excited to produce a controlled torque on the rotor, the torque being proportional to the field intensity of the rotor magnet(s) and the amplitude of the stator phase excitation, thus permitting control of the rotor motion. When such motors are employed for high performance servo drive applications which require precise control of rotor motion, the use of feedback signals representing rotor position and rotor velocity becomes necessary. The most common method for obtaining sufficiently accurate feedback signals is to mount a high-resolution magnetic resolver or optical encoder to the rotor shaft, in order to directly measure the rotor position with sufficient accuracy, and then to electronically process this direct rotor position measurement to obtain an indirect measurement of rotor velocity. There are several disadvantages associated with shaft-mounted rotor position sensors, including their cost, size, mass, and potential unreliability.

Another approach for obtaining the feedback signals needed to control permanent-magnet synchronous motors is to install Hall-effect position sensing devices inside the stator housing. Such Hall-effect devices detect only the polarity of the rotor's magnetic field and, hence, provide only a coarsely quantized measure of rotor position. In general, the quantization factor (i.e., resolution) associated with Hall-effect devices is determined by the number of rotor poles and stator phases, and cannot be improved upon for a given motor. By contrast, shaft-mounted position sensors have quantization factors that depend only on the precision of the sensor construction, not on the construction details of the motor to which it is attached. The coarse quantization of the rotor position signal obtained from Hall-effect devices also leads to difficulties in the determination of the corresponding rotor velocity signal. At low velocity, the rotor passes from one quantization interval to another infrequently and, hence, the indications of rotor velocity cannot be updated at a sufficiently high rate to be accurate.

A motor equipped with a shaft-mounted high accuracy position sensor can be controlled in servo fashion, with the stator phase excitation continuously modulated substantially in response to the accurately measured values of rotor position and rotor velocity. Due to the high accuracy of the feedback signals in such a servo system, it is possible to control the instantaneous value of rotor torque and thus to achieve precise control of rotor motion. The motion control goals that can be achieved in such a servo system include velocity control, in which the rotor is commanded to regulate to a fixed desired velocity or to track a time-trajectory of desired velocities, and position control, in which the rotor is commanded to regulate to a fixed desired position or to track a time-trajectory of desired positions. Since the phase excitation is determined by the feedback signals, the accuracy of the motion control critically depends on the accuracy of the sensor measurements. If Hall-effect devices are used as the only means of measuring rotor position and rotor velocity, the quantization of the feedback signals limits the possible control actions to selection of commutation instants or phase firing angles. Since phase excitation is not continuously modulated using Hall-effect devices, only the average value (rather than instantaneous value) of rotor torque can be controlled, and consequently the accuracy of rotor motion is rather limited.

As disclosed in prior art, permanent-magnet synchronous motors can be used simultaneously as actuators and sensors of motion. For high performance servo drive applications, this combined actuator sensor mode of operation requires, at minimum, the highly accurate estimation of rotor position from purely electrical measurements taken at the stator terminals (with highly accurate estimation of rotor velocity achieved by processing the rotor position estimates in the traditional way). Alternatively, rotor position and rotor velocity may be estimated simultaneously from stator terminal measurements, instead of using the traditional sequential processing. Measurable stator terminal signals are limited to the phase currents (the currents flowing through the phase windings), and either the applied phase voltages (in case the phase is receiving excitation from the power source and hence has a nonzero current flowing through its winding) or the open-circuit phase voltages (in case the phase is unexcited and hence is disconnected from the power source with no current flowing through its winding).

It is well known that if the rotor of a permanent-magnet synchronous motor is rotating with significant velocity, then the rotating magnetic field set up by the rotor magnet(s) will induce an electromotive force, or back-EMF voltage, on the stator phase windings. The back-EMF voltage is dependent upon both rotor position and velocity and, when it is present, it influences the stator phase dynamics. Consequently, the back-EMF voltage, when it is present, can potentially play a useful role in rotor motion estimation schemes. However, the back-EMF voltage is periodic with respect to rotor position (with an integer number of cycles per revolution determined by the construction of the rotor) and, more significantly, is linearly proportional to the rotor velocity. Hence, the back-EMF voltage is not present on any stator phase if the rotor is not rotating. If the rotor is rotating but with negligible velocity, then the back-EMF voltage will be contaminated by noise. The back-EMF voltage therefore possesses no direct utility for the estimation of rotor position when the rotor is completely or practically motionless. Even when the back-EMF voltage is present, it cannot be directly measured at the stator terminals of a given stator phase unless this same stator phase is unexcited (open-circuited with no current flowing through it). Due to the periodicity of the back-EMF voltage with respect to rotor position, schemes using this signal cannot estimate the rotor position in an absolute sense (at least without including some heuristic procedures), but instead can only estimate rotor position relative to the electrical cycle.

Subject to the limitations discussed above, the back-EMF voltage has been used in prior art to estimate rotor motion (i.e., rotor position and rotor velocity). Other rotor motion estimation schemes, such as those relying on naturally present variable phase inductance or saturation-induced variable phase inductance, are not suitable for all types of permanent-magnet synchronous motors. Most of the existing rotor motion estimation schemes based on the back-EMF voltage do not have the objective of estimating rotor position with accuracies typical of traditional shaft mounted sensors, such as magnetic resolvers or optical encoders. Instead, the goal of most existing rotor motion estimation schemes is simply to eliminate the need for Hall-effect position sensing devices mounted inside the stator housing. Since quantization can be tolerated in this case, these rotor motion estimation schemes seek to detect events, measurable at the stator terminals, which are expected to occur once each step within the commutation sequence. For example, a detectable event directly related to the back-EMF voltage is the zero-crossing of an open-circuit phase voltage. All so-called event detection methods for estimating rotor motion have the disadvantage of coarse feedback quantization, as well as the corresponding disadvantage of limited motion control accuracy. Thus, there is a general need for a more precise method of estimating rotor motion, not limited by the quantization effects of event detection schemes.

Prior art also discloses rotor motion estimation schemes with the potential to serve as replacements for traditional high accuracy shaft mounted sensors, subject to certain limitations. For example, U.S. Pat. No. 5,134,349 to Kruse discloses a sensorless controller for permanent-magnet synchronous motors which continuously modulates the phase excitation to achieve instantaneous torque control, with the feedback signals obtained by processing the back-EMF voltage in a continuous fashion. However, this technique is disclosed only for motors with two stator phases (or motors with three interconnected stator phases), with sinusoidal back-EMF voltage characteristics, and with sensing coils mounted inside the stator. The most appropriate motors for many applications have more than two or three phases, and have non-sinusoidal back-EMF voltage characteristics. Moreover, the use of internal sensing coils is a disadvantage because such coils add to the cost and size of the motor, reduce the power density of the motor, and decrease reliability due to the additional wiring connections between the motor and the control electronics. Therefore, a need still exists for a rotor motion estimation method for motors with any number of stator phases, with any periodic back-EMF voltage shape, and without sensing coils mounted inside the stator.

A more elaborate method for potentially replacing high accuracy shaft mounted sensors is disclosed in the article "Real-Time Observer-Based (Adaptive) Control of a Permanent-Magnet Synchronous Motor Without Mechanical Sensors," by R. B. Sepe and J. H. Lang, 1991. A sensorless controller is described which continuously modulates the phase excitation to achieve instantaneous torque control, with feedback signals obtained by simulating (solving forward in time from assumed initial conditions) a mathematical model of the motor and its load, augmented with a correction term used to compensate for errors between the values of stator current predicted by the simulated model and the measured values of stator current. However, this technique is disclosed only for motors with two stator phases (or motors with three interconnected stator phases), with sinusoidal back-EMF voltage characteristics, and with a known model for the rotor load. The disadvantages associated with the required number of phases and required back-EMF voltage shape have already been set forth. Furthermore, rotor load parameters such as friction coefficients, load torque, and load inertia often are difficult or impossible to measure or approximate accurately, and consequently this method of estimation is adversely affected by such unavoidable parametric errors. There still exists a need for a rotor motion estimation method for motors with any number of stator phases, with any periodic back-EMF voltage shape, and which does not need explicit knowledge of rotor load parameters.

Prior art rotor motion estimation methods fail to function as desired at low velocities and at zero velocity. In the method of Kruse, for example, the loss of the back-EMF voltage at low and zero velocities requires an abrupt transition to a hold-mode wherein large currents are applied to the phases in order to hold the rotor in place. Also, in the method of Sepe and Lang, the error between the estimated and actual rotor positions does not converge to zero at a reasonable rate at low velocities, and may actually diverge at low velocities for a motor wherein the phase inductance is independent of rotor position. Selection of gains for the correction term is not systematic. Hence, there still exists a need for a technique which is capable of estimating rotor position at standstill. It is to the provision of this need and the additional needs identified above that the present invention is primarily directed.

SUMMARY OF THE INVENTION

Briefly described, the present invention is a method and apparatus for simultaneously estimating instantaneous rotor position and instantaneous rotor velocity for a multiphase permanent-magnet synchronous motor. The method is implemented by measuring the phase currents and (if necessary) the phase voltages, processing these measurements to provide an approximation of the phase back-EMF voltages, and producing an indication of instantaneous rotor position and instantaneous rotor velocity from the back-EMF voltage approximations. The final step of the method, in which position and velocity are ascertained from back-EMF approximations, may be carried out on the basis of a single point in time formulation or a multiple points in time formulation.

The apparatus includes means for measuring the phase currents and phase voltages, means for processing the phase currents and phase voltages to provide an approximation of the phase back-EMF voltages, and means for producing an indication of instantaneous rotor position and instantaneous rotor velocity from the back-EMF voltage approximations. The apparatus also includes means for determining rotor position and rotor velocity from the back-EMF approximations based on either a single point in time formulation or a multiple points in time formulation.

The apparatus may preferably be embodied in a single microprocessor. In addition, the means for estimating the instantaneous rotor position and instantaneous rotor velocity may be combined with a controller and inverter to form a complete closed-loop control system for a permanent-magnet synchronous motor.

Accordingly it is an object of the present invention to provide a rotor motion estimation scheme for permanent-magnet synchronous motors which achieves high resolution estimation of rotor motion regardless of the number of stator phases or the shape of the back-EMF voltage.

Another object of the present invention is to provide a rotor motion estimation scheme which is highly accurate and reliable at low velocities and at zero velocity.

Another object of the present invention is to provide a rotor motion estimation scheme which is insensitive to measurement noise present in the phase current and phase voltage measurements.

It is another object of the present invention to provide a motion control scheme which uses estimates of rotor position and rotor velocity, instead of motion measurements obtained from shaft-mounted sensors or Hall-effect sensors, for the control of rotor motion.

It is yet another object of the present invention to provide sensorless control schemes for the control of either rotor position or rotor velocity.

These and other objects, features and advantages of the present invention will become more apparent upon reading the following description in conjunction with the accompanying drawings.

DETAILED DESCRIPTION OF THE INVENTION

Figure 1:
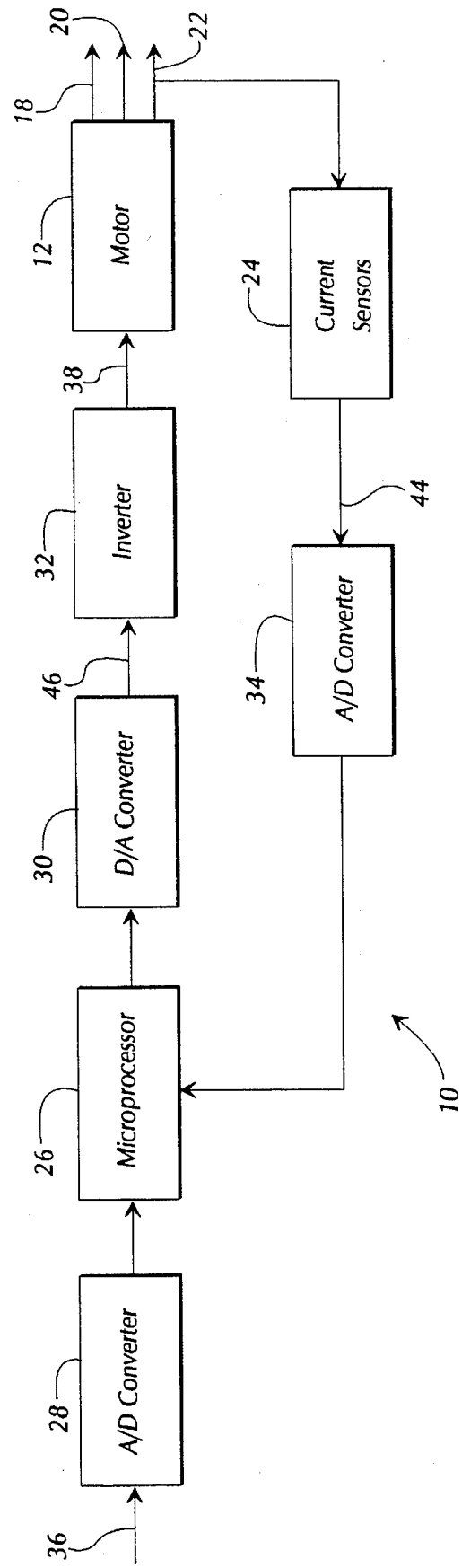
FIG. 1 is a schematic block diagram of a system for implementing the methods of the present invention.
Figure 2:
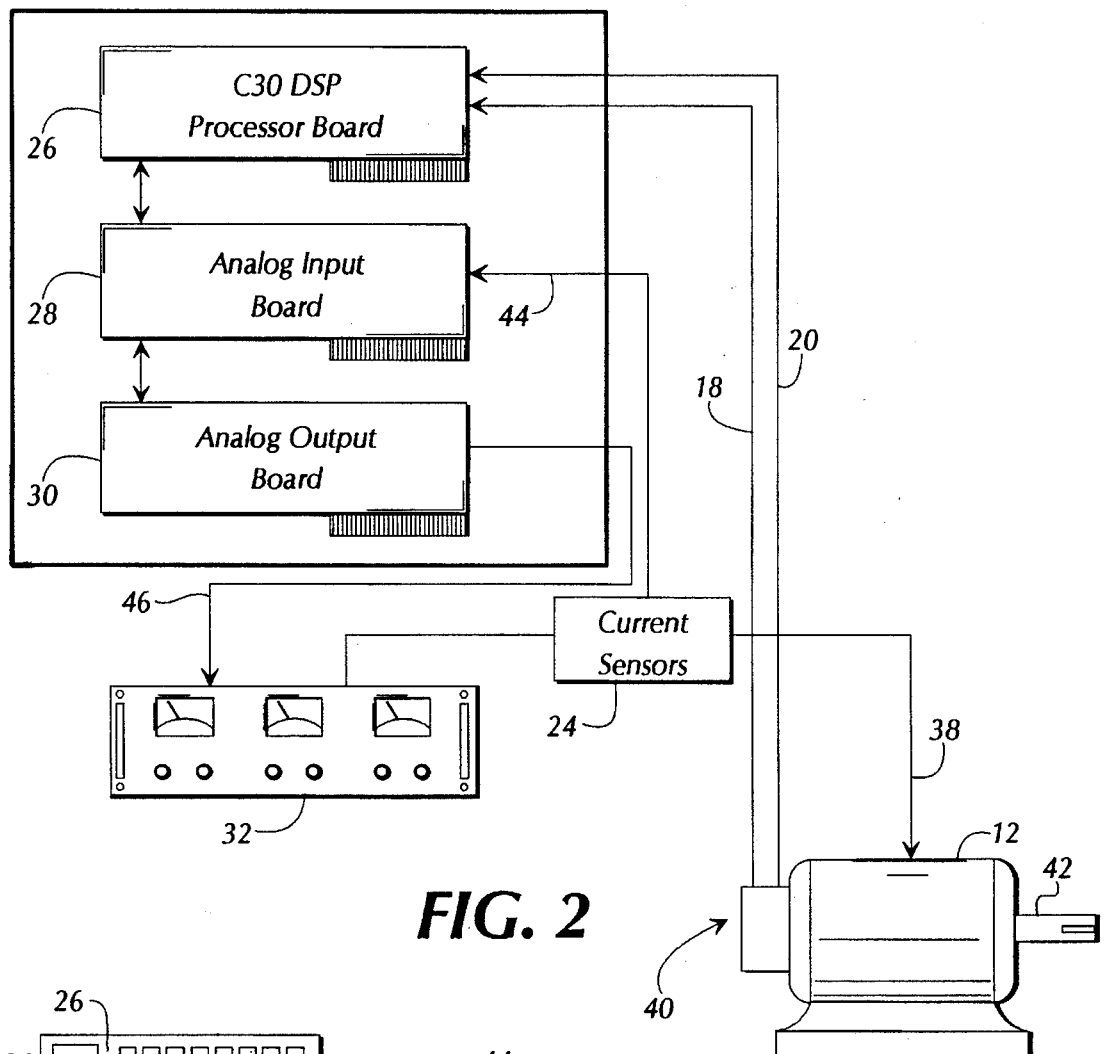
FIG. 2 is a schematic illustration of one embodiment of the system of FIG. 1 shown in conjunction with a device for determining the performance of the system.
Figure 3:
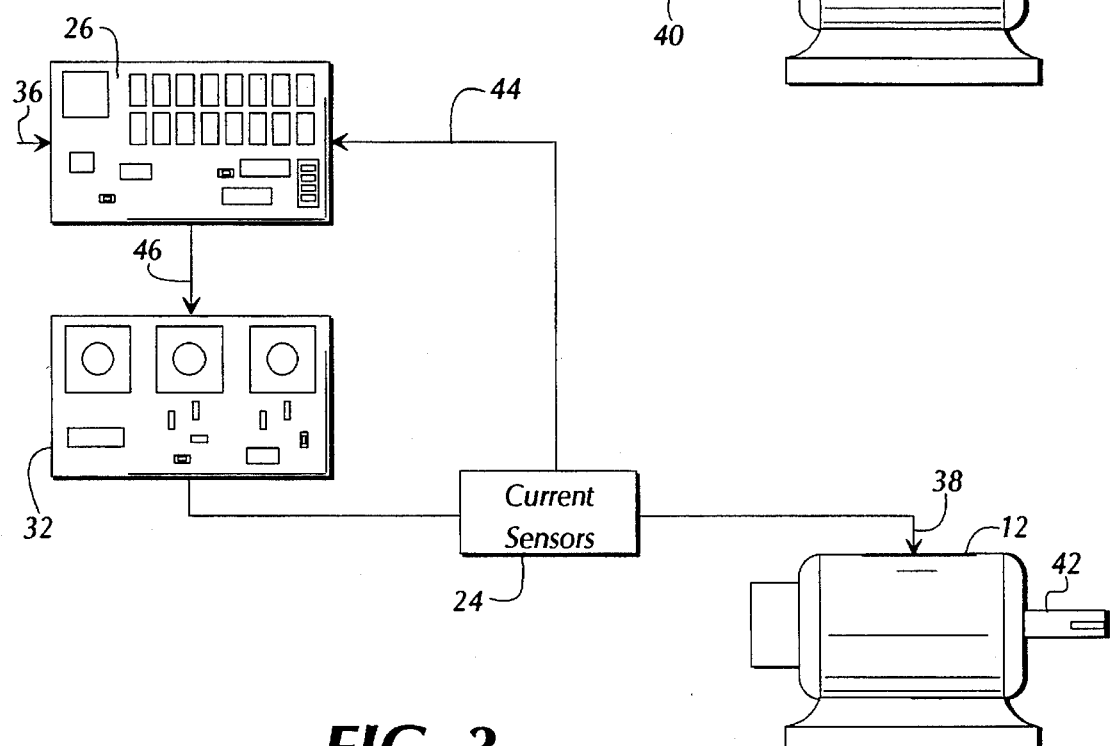
FIG. 3 is a schematic illustration of another embodiment of the system of FIG. 1.

Referring now to FIGS. 1–3 wherein like reference numerals represent like parts, a complete closed-loop control system 10 including the motion estimation method and apparatus of the present invention is shown in conjunction with a permanent-magnet synchronous motor 12. Motor 12 is not equipped with a shaft-mounted position sensor nor with Hall-effect position sensors. The phase windings of motor 12 are electrically connected to an inverter 32. A current sensor 24 measures phase currents 22 which are sensed as phase current measurements 44 by a microprocessor 26 via analog-to-digital converter 34. Microprocessor 26 estimates rotor position 20 and rotor velocity 18 and controls rotor position 20 and rotor velocity 18 based on the motion estimates. Both features of estimating and controlling rotor position 20 and rotor velocity 18 are embedded within the hardware and software of microprocessor 26. Microprocessor 26 receives input command 36 via analog-to-digital converter 28. Microprocessor 26 is capable of estimation-based control of either rotor position or rotor velocity, depending on the type of command presented at input command 36. Microprocessor 26 also commands inverter 32 via digital-to-analog converter 30 and inverter command 46 to apply specified phase voltages 38 to motor 12.

Referring now more specifically to FIG. 2, an embodiment of the present invention is shown in conjunction with a device useful for determining the performance of motion estimation and control. Motor 12 is equipped with rotor motion sensor 40 mounted on rotor shaft 42. Motion sensor 40 provides microprocessor 26 with direct measurements of rotor position 20 and rotor velocity 18 for comparison with estimates of rotor position 20 and rotor velocity 18. Current sensor 24 provides phase current measurement 44 to microprocessor 26 via analog-to-digital converter 28. Microprocessor 26 estimates rotor motion and commands inverter 32 via inverter command 46 obtained from digital-to-analog converter 30, and inverter 32 applies phase voltages 38 to the phase windings.

Referring now more specifically to FIG. 3, an alternate embodiment of the present invention is shown comprising microprocessor 26, inverter 32, current sensor 24, and motor 12. In this embodiment, analog or digital position or velocity commands may be fed to microprocessor 26 at input command 36. The phase current measurement 44 is used by microprocessor 26 to estimate the rotor motion, and microprocessor 26 determines inverter command 46 for purposes of controlling the rotor motion, resulting in the application of phase voltage 38.

Having above described the general sensorless control scheme, including both the rotor motion estimation scheme and the feedback controller which uses the rotor motion estimates to guide the rotor motion, attention is now turned to more detailed descriptions of the present invention. The present invention estimates rotor motion by considering the back-EMF voltage, either at a single point in time or at multiple points in time, and these two cases are described separately.

Prior to any discussion of how back-EMF voltage can be used to estimate rotor motion, it is first necessary to consider techniques for extracting the back-EMF voltage from the stator terminals of a permanent-magnet synchronous motor. If all stator phases of the motor are open-circuited, then the voltage directly measured at each of the stator terminals is equal to the back-EMF voltage of the corresponding stator phase. However, motion control applications require that at least one of the stator phases be driven from an excitation source at any given time. Moreover, the most efficient mode of operation, which achieves the highest possible power density for a given motor, requires that all stator phases be connected to the excitation source at all times. In this preferred operating mode, no open-circuited stator phases are available, so direct measurement of the back-EMF voltage is impossible.

One aspect of the present invention is to avoid the need for open-circuited stator phases altogether, by reconstructing (instead of directly measuring) the back-EMF voltage from stator terminal measurements known to be available under all circumstances. The stator currents (the currents flowing through the stator phase windings) are always available for measurement, and the stator voltages (the voltages across the stator phase windings) are always either known, because they are commanded by a controller, or else can always be measured. With knowledge of stator currents and stator voltages, the back-EMF voltage $v_{emf}$ can be reconstructed according to $$v_{emf}(t) = v(t) - Ri(t) = L\frac{di(t)}{dt} \quad (1)$$

where v denotes the vector of stator voltages, i denotes the vector of stator currents, R denotes the diagonal matrix of phase winding resistances, L denotes the positive-definite symmetric matrix of phase winding inductances, and t denotes time. Note that equation (1) holds true whether a stator phase is energized or open-circuited, the latter case implying the substitution of i=0 into the last two terms. Provided that the motor is capable of producing torque at every rotor position, the signal $v_{emf}$ is zero if and only if the rotor velocity is zero. Since the time derivative of stator current is not directly measurable, use of equation (1) generally requires some approximations, even if R and L are known precisely.

A point to consider when reconstructing the back-EMF voltage from equation (1) is that the motor controller typically commands either the stator voltages or the stator currents. If the controller is a digital controller, then the voltage or current command signals will typically be piecewise constant signals, i.e. signals which are constant over each sampling interval and which discontinuously change their values at the sampling instants. Regardless of which command mode is used by the controller, certain simplifying approximations to equation (1) may be made to account for the abovementioned features, as will be clear to those skilled in the art. Another approximation which is often acceptable in practice is to neglect the effect of inductance, by assuming that L≈0. Such an approximation is convenient, since it removes the need to approximate the time derivative of stator current. When the influence of inductance is deemed to be critical, approximation schemes for time derivatives may be used. One such approximation would be to divide the difference between two consecutive values of stator current by the difference between the corresponding two time instants. Regardless of the specific details behind the simplifications and approximations introduced, equation (1) forms the basis for reconstructing the back-EMF voltage without requiring any stator phases to be open-circuited.

Perhaps the greatest difficulty faced in the implementation of rotor motion estimation schemes relates to measurement noise, parametric errors, etc. The influence of these undesirable effects may lead to incorrect estimates of rotor position and rotor velocity. Moreover, if the motor has more than two stator phases, then the number of back-EMF voltage constraints at any single point in time will always be greater than the number of unknowns (rotor position and rotor velocity). When considering a history of back-EMF voltage at multiple points in time, the number of constraints on possible rotor positions and rotor velocities grows. The back-EMF voltage constraints thus generally form an overdetermined system of algebraic equations. Overdetermined systems of equations are usually inconsistent, meaning in this case that there do not exist values of rotor position and rotor velocity that solve each of the equations simultaneously. Hence, one way to proceed in this case would be to select only two of the back-EMF voltage constraints and to solve them uniquely, if possible, for rotor position and rotor velocity. The drawback of such an approach is that the two selected constraint equations may be the ones most affected by noise and other error sources, and the resulting estimates of rotor position and rotor velocity will contain the worst possible errors. Uniquely solving for the rotor variables from the minimum number of back-EMF voltage constraints is undesirable, because the estimates are extremely sensitive to noise and other error sources.

A better, alternate method for estimation can be employed, which is generally described as follows. Given a nonlinear system of m equations and n unknowns with m>n, say f(x)=y where x is the vector of unknowns, it is highly unlikely that an x can be found for which f(x) equals y. Instead, it makes sense to look for a vector x for which f(x) is closest to y. For each x, there is an associated residual r(x)=f(x)−y. The distance between f(x) and y is given by the Euclidean norm of this residual, namely ∥r(x)∥. The nonlinear least squares problem is to find a vector x for which ∥r(x)∥ will be a minimum. The problem takes its name from the fact that minimizing ∥r(x)∥ is equivalent to minimizing ∥r(x)∥², which is equal to the sum of the squares of the m residual components. A vector x that minimizes the norm, or the norm squared, of the residual is said to be a least squares solution to the system of nonlinear equations f(x)=y. For the special case where the equations depend on x in a linear way, i.e. f(x)=Ax for some constant matrix A, then the nonlinear least squares problem reduces to a linear least squares problem which is particularly simple to solve using standard techniques from linear algebra. Solution of a nonlinear least squares problem is much more challenging, typically requiring iterative methods such as the Gauss-Newton and Levenberg-Marquardt algorithms. The existence of a unique solution to a linear least squares problem is guaranteed if the matrix A has full column rank. The existence of a locally unique solution to a nonlinear least squares problem, near some current estimate $x_c$ of the problem's true solution $x_*$, is guaranteed if the Jacobian matrix of $$f(x) \text{ at } x = x_c, \text{ i.e. } \frac{\partial f}{\partial x}(x_c),$$

has full column rank. If f(x) is a one-to-one function on its domain, then this Jacobian rank condition guarantees a unique global solution, on the domain of f(x), to the nonlinear least squares problem.

The method according to one form of the present invention is essentially the application of the least squares data fitting technique, as described above, to the problem of rotor motion estimation from reconstructed back-EMF voltage. Consider first the case in which the back-EMF voltage at just a single point in time is to be used for estimation. In this case there are two unknowns, rotor position θ and rotor velocity ω, which play the role of x in the above general description of least squares. The function which depends on these unknowns is the back-EMF voltage function, which will be denoted by $H_1$, with the subscript I intended to indicate the single point in time formulation. The function $H_1$ may be predetermined and completely characterized for any given motor, using standard measurement methods. Playing the role of f(x) in the above general description of least squares, the function is given by $$H_1(\theta, \omega) = \omega K(\theta) \quad (2)$$

where K(θ) is a periodic function. Although $H_1$ depends on ω in a linear way, it depends on θ in a nonlinear way. It is desired to fit the function $H_1$, at each time t, to the reconstructed back-EMF voltage data, obtained by approximating the signal $v_{emf}$ defined in equation (1). This approximation step yields from equation (1) an approximate back EMF voltage $$e_1(t) = \hat{v}_{emf}(t) \quad (3)$$

where $\hat{v}_{emf}$ denotes any approximation of $v_{emf}$ and the subscript 1 indicates the single point in time formulation. The approximate back-EMF voltage $e_1$ plays the role of y in the above general description of least squares. The available data $e_1$ and the function $H_1$ ideally would be consistent, such that the set of constraint equations $$H_1(\theta(t),\omega(t))=e_1(t) \quad (4)$$

could be satisfied by a unique pair of unknowns $(\theta,\omega)$. Naturally though, equation (4) is expected to be inconsistent in practice, due to errors introduced in the characterization of $H_1$, errors in the approximation of $v_{emf}$, and errors in the measurement of stator voltage and stator current. Moreover, if the motor has more than two phases, then there may be no pair of unknowns capable of simultaneously satisfying all constraint equations, even if the abovementioned error sources are practically not present. Hence, a nonlinear least squares data fitting problem is set up, and the estimates of rotor position and rotor velocity at time t are taken to be $$\begin{bmatrix} \hat{\theta}(t) \\ \hat{w}(t) \end{bmatrix} = \arg\min_{\theta,w} \|H_1(\theta,w) - e_1(t)\| \quad (5)$$

From the above general description of least squares, it is known that the Jacobian matrix of $H_1$ is useful in ascertaining the existence of a unique local minimizer. It is easy to verify from equation (2) that the Jacobian of $H_1$ has full rank (equal to 2) if $\omega \neq 0$, for typical $K(\theta)$ characteristics. It follows that estimation of rotor position and rotor velocity when $\omega \neq 0$ is feasible, using the single point in time formulation. However, regardless of $K(\theta)$, the Jacobian of $H_1$ does not have full rank if $\omega=0$. Hence, estimation of rotor position at zero velocity is not feasible, because the rotor position is not (locally) uniquely determined when $\omega=0$, using the single point in time formulation.

Since the method described above is not feasible if $\omega=0$, it is natural to augment the least squares data fitting problem to include back-EMF voltage values at two or more points in time. The difficulty at zero velocity is due to a loss of independent constraints. Therefore, by adding additional constraints by including more of the available data, there will be a greater opportunity for a (locally) unique least squares solution to exist. Consider specifically the case in which the back-EMF voltage at two points in time is to be used for estimation. The two unknowns, as before, are the rotor position $\theta$ and the rotor velocity $\omega$, so the interpretation of x from the general least squares problem is unchanged. The back-EMF voltage function of interest here will be denoted by $H_2$, with the subscript 2 intended to indicate the two points in time formulation. The function $H_2$ may be predetermined and completely characterized for any given motor and load, using measurement methods known to those skilled in the art, provided however that the rotor load, once characterized, is not subject to change. Playing the role of $f(x)$ for the general least squares problem, the function is given by $$H_2(\theta,w,v) = \begin{bmatrix} wK(\theta) \\ F_w(\theta,w,v)K(F_\theta(\theta,w)) \end{bmatrix} \quad (6)$$

where $F_\theta$ and $F_\omega$ model the mechanical dynamics of the rotor and load, as defined by $$\begin{bmatrix} \theta(t_{n+1}) \\ w(t_{n+1}) \end{bmatrix} = \begin{bmatrix} F_\theta(\theta(t_n),w(t_n)) \\ F_w(\theta(t_n),w(t_n),v(t_n)) \end{bmatrix} \quad (7)$$

The time arguments appearing in equation (7) indicate a discrete sampling process, a common form of sampling being periodic sampling with period T (in which case the nth sampling instant would be $t_n=nT$). The mechanical model of the rotor and load generally depends on parameters such as rotor and load inertias, viscous and Coulomb friction coefficients, and load torque. Note that $H_2$ has twice as many terms as $H_1$, that both components of $H_2$ represent back-EMF voltages, and that the upper and lower components differ by one sampling instant. Perhaps the most striking feature of $H_2$ in comparison with $H_1$ is that $H_2$ explicitly depends on v, the stator phase voltages. The general idea is to fit the function $H_2$, at each time $t_{n-1}$, to the reconstructed back-EMF voltage data, obtained by approximating the signal $v_{emf}$ defined in equation (1) at times $t_{n-1}$ and $t_n$. The two approximate back-EMF voltages are grouped according to $$e_2(t_n) = \begin{bmatrix} \hat{v}_{emf}(t_{n-1}) \\ \hat{v}_{emf}(t_n) \end{bmatrix} \quad (8)$$

where $\hat{v}_{emf}$ denotes any approximation of $v_{emf}$ and the subscript 2 indicates the two points in time formulation. The approximate back-EMF voltages of $e_2$ play the role of y from the general least squares problem. If the characterization of $H_2$, the approximation of $v_{emf}$, and the measurements of stator current and stator voltage were error free, then the set of constraint equations $$H_2(\theta(t_{n-1}),\omega(t_{n-1}), v(t_{n-1}))=e_2(t_n) \quad (9)$$

would be simultaneously satisfied by a (locally) unique pair of unknowns $(\theta,\omega)$. Since equation (9) is expected to be inconsistent, the estimates of rotor position and rotor velocity at time $t_{n-1}$ are taken from the nonlinear least squares problem $$\begin{bmatrix} \hat{\theta}(t_{n-1}) \\ \hat{w}(t_{n-1}) \end{bmatrix} = \arg\min_{\theta,w} \|H_2(\theta,w,v(t_{n-1})) - e_2(t_n)\| \quad (10)$$

and the estimate values at the present time $t_n$ are determined by propagating the least squares estimates from equation (10) through the mechanical model of the rotor and load, i.e.

$$\begin{bmatrix} \hat{\theta}(t_n) \\ \hat{w}(t_n) \end{bmatrix} = \begin{bmatrix} F_\theta(\hat{\theta}(t_{n-1}),\hat{w}(t_{n-1})) \\ F_w(\hat{\theta}(t_{n-1}),\hat{w}(t_{n-1}),v(t_{n-1})) \end{bmatrix} \quad (11)$$

Due to the fact that $H_2$ depends explicitly on the stator phase voltage v, the Jacobian matrix of $H_2$ can have full rank (equal to 2), even when $\omega=0$. This desirable situation requires appropriate choices of stator excitation v. With appropriate choices of v, the full rank Jacobian of $H_2$ implies the existence of a unique local minimizer. It follows that estimation of rotor position at zero velocity is achieved using the two points in time formulation.

The differences between the two formulations disclosed above can be illustrated using physical insight. The methodology based on the back-EMF voltage at a single point in time fails for the stationary rotor case because, even though a measurement of $v_{emf}(t)=0$ directly implies $\omega(t)=0$, there is simply no information in equation (4) from which to infer a value for $\theta(t)$. If the rotor is stationary, then equation (4) will hold true regardless of the assumed value of rotor position, and hence there is no mechanism for reducing any rotor position estimation error which may be present. It should also be clear that the choice of stator excitation has no influence on this issue. On the other hand, consider a reconstruction of the back-EMF voltage at two points in time, say $t_1$ and $t_2$, which for a stationary rotor would yield $v_{emf}(t_1)=v_{emf}(t_2)=0$. Assuming that sampling instants $t_1$ and $t_2$ are spaced sufficiently close together, several logical conclusions may be made. Since the two back-EMF voltages are both equal to zero, it follows that $\omega(t_1)=\omega(t_2)=0$, that no acceleration or deceleration of the rotor has occured over the sampling interval, and thus that the torque produced on the rotor by the stator excitation has exactly balanced the load torque over the sampling interval. Hence, it follows that $\theta(t_1)=\theta(t_2)=\theta_*$ where $\theta_*$ is any rotor position at which the known stator excitation would produce a torque, according to a known torque model, which would balance the load torque.

Determination of $\theta_*$ in this fashion clearly requires a knowledge of load torque. This requirement can be viewed either as an advantage, due to the additional constraints on possible rotor positions that are introduced, or as a disadvantage, due to the fact that in some applications the load torque cannot be accurately modeled. The important point is that, with a load torque model, it is possible to limit possible rotor positions to those for which a torque balance is achieved. For the stationary rotor case, no such limitation on possible rotor positions is available when considering only a single point in time. In contrast, when two or more reconstructions of the $v_{emf}$ signal indicate that the rotor is stationary, any potential rotor position estimation error present will be eliminated by requiring that the torque balance equation hold true.

Note that this concept places constraints on the type of stator excitation which must be present at a zero velocity steady state. For example, if the rotor is unloaded, then the torque balance will be achieved by ensuring that zero torque is produced on the rotor. The catch is that even an absence of stator excitation would suffice in this case to achieve the torque balance. However, if no stator excitation were applied, then the torque produced on the rotor would be zero regardless of the rotor position, so there would be no hope to isolate the true rotor position. To overcome this difficulty, it is necessary to intentionally apply a nonzero stator excitation, even though the excitation is not actually needed to maintain the torque balance, so that rotor position estimation errors will not persist.

In the zero load torque case, it is possible to choose the stator excitation on the basis of the commanded rotor position or the estimated rotor position. Using the commanded rotor position, it is known that zero torque is produced by the chosen stator excitation only when the actual rotor position matches the commanded rotor position (assuming zero load torque). Hence, the possible rotor positions are limited and must be equal to the commanded rotor position, relative to the electrical cycle. If a non-persisting disturbance occurs, resulting in a change in the rotor position (but with zero load torque assumed), then the estimated rotor position will become correct again, even though the estimate does not change value, due to the fact that the stator excitation will return the rotor to the commanded rotor position once the disturbance has been removed. Using the estimated rotor position, the stator excitation is selected in response to the rotor position estimate. If the estimate is correct, then the choice of stator excitation will indeed produce zero torque, the rotor will stay stationary, the next reconstruction of back-EMF voltage will indicate zero rotor velocity, and thus the same stator excitation will be applied again as the entire process repeats. If the estimate is not correct, then necessarily the stator excitation will produce a nonzero torque, resulting in a motion which, by proper selection of the excitation polarities, will be in the direction of the originally estimated rotor position, such that the estimation process is self-correcting.

The present invention may be implemented on the basis of either on-line or off-line solution of the least-squares problem. The on-line approach involves real-time computation of the least-squares solution on a sufficiently fast microprocessor. By presolving the least-squares problem for all possible values of back-EMF and storing the solutions in a memory chip, the need for a microprocessor is eliminated in the off-line approach.

From the above, it will be apparent that a new and improved method and apparatus for accurately estimating the instantaneous rotor position and instantaneous rotor velocity, in simultaneous fashion, from measurements available at the stator terminals of a permanent-magnet synchronous motor, has been developed. The present invention applies to a large class of motors, including those with any number of phases and those with any periodic back-EMF voltage shape. The present invention does not require the presence of Hall-effect position sensors, sensing coils inside the stator, or shaft-mounted motion sensors. The accuracy of the present invention is not affected by the number of poles or the number of phases.

Although a specific embodiment has been described and depicted herein, it will be appreciated by those skilled in the art that various modifications, substitutions, deletions and additions may be made, without departing from the spirit and scope of the invention. By way of example, the nonlinearity $K(\theta)$ could be modeled as a piecewise-linear function, thereby permitting the reduction of the nonlinear least-square squares problem of equation (5) into a linear least-squares problem in the variables $\theta\omega$ and $\omega$. Other variations will occur to those skilled in the art. It is, therefore, to be understood that the claims appended hereto are intended to cover all such modifications and changes which fall within the true spirit and scope of the invention.

What is claimed is:

1. A method for concurrently estimating instantaneous rotor position and instantaneous rotor velocity in a multiphase permanent-magnet synchronous motor, comprising the steps of:

(a) applying control voltages and sensing voltages to the phases of the motor;

(b) measuring phase currents resulting from the applied control and sensing voltages;

(c) determining a back-EMF value for each phase from the phase currents, the control voltages, and the sensing voltages, at two or more distinct times; and (d) simultaneously determining estimates of instantaneous rotor position and instantaneous rotor velocity from the back-EMF values determined for the two or more distinct times using a predetermined back-EMF model, the model having a dependence on rotor position and rotor velocity at two or more points in time, and the model also having a dependence on mechanical parameters characterizing the rotor and its load.

2. The method of claim 1 wherein the estimates of instantaneous rotor position and instantaneous rotor velocity of step (d) are provided as feedback signals, along with a signal representing the desired position trajectory, to a control system for purposes of guiding the instantaneous values of rotor position.

3. The method of claim 1 wherein the estimates of instantaneous rotor position and instantaneous rotor velocity of step (d) are determined by solving a set of back-EMF equations using a least-squares technique.

4. The method of claim 3 wherein the number of back-EMF equations to be solved is equal to twice the number of stator phases, with half of the equations corresponding to present back-EMF values and half of the equations corresponding to previous back-EMF values.

5. The method of claim 1 wherein the step of determining estimates of rotor position and rotor velocity comprises comparing the determined back-EMF values for the two or more distinct times with pre-existing data stored in a table.

6. The method of claim 1 wherein the sensing voltages of step (a) are selected according to a predetermined back-EMF model used for step (d), the model having a dependence on rotor position and rotor velocity at two or more distinct points in time, and wherein the model associates with each back-EMF value determined in step (c) a locally unique rotor position and rotor velocity when the rotor is stationary.

7. A method for concurrently estimating instantaneous rotor position and instantaneous rotor velocity in a multiphase permanent-magnet synchronous motor, comprising the steps of:

(a) applying phase voltages to the motor;

(b) measuring phase currents resulting from the applied phase voltages;

(c) determining a back-EMF value for each phase from the phase currents and phase voltages, at a single point in time; and (d) simultaneously determining estimates of instantaneous rotor position and instantaneous rotor velocity from the back-EMF values determined for the single point in time using a predetermined back-EMF model, the model having a dependence on rotor position and rotor velocity at a single point in time, and the model being independent of all mechanical parameters characterizing the rotor and its load.

8. The method of claim 7 wherein the estimates of instantaneous rotor position and instantaneous rotor velocity of step (d) are provided as feedback signals, along with a signal representing the desired velocity trajectory, to a control system for purposes of guiding the instantaneous values of rotor velocity.

9. The method of claim 7 wherein the estimates of instantaneous rotor position and instantaneous rotor velocity of step (d) are determined by solving a set of back-EMF equations using a least-squares technique.

10. The method of claim 9 wherein the number of back-EMF equations to be solved is equal to the number of stator phases, with each of the equations corresponding to present back-EMF values.

11. The method of claim 7 wherein the step of determining estimates of rotor position and rotor velocity comprises comparing the determined back-EMF values for the single point in time with pre-existing data stored in a table.

12. The method of claim 7 wherein a predetermined back-EMF model is used in step (d), the model having a dependence on rotor position and rotor velocity at a single point in time, and wherein the model associates with each back-EMF value determined in step (c) a locally unique rotor position and rotor velocity when the rotor is non-stationary, irrespective of the phase voltage of step (a).

* * * * *